M. WATERBURY.

Car-Couplings.

No. 5,818. Reissued March 31, 1874.

ATTEST:
H. S. Sprague
Chas. E. Hackett

INVENTOR:
M. Waterbury
Per Attorney
Thos. S. Sprague

AM. PHOTO-LITHOGRAPHIC Co. N. Y. (OSBORNE'S PROCESS.)

UNITED STATES PATENT OFFICE.

MILAN WATERBURY, OF POLO, ILLINOIS, ASSIGNOR, BY MESNE ASSIGNMENTS, TO WILLIAM B. WAY.

IMPROVEMENT IN CAR-COUPLINGS.

Specification forming part of Letters Patent No. 34,384, dated February 11, 1862; reissue No. 5,818, dated March 31, 1874; application filed February 14, 1873.

*To all whom it may concern:*

Be it known that MILAN WATERBURY, of Polo, in the county of Ogle and State of Illinois, has invented a new and useful Improvement in Car-Couplings; and I do declare that the following is a true and accurate description thereof, reference being had to the accompanying drawings, and to the letters of reference marked thereon, and being a part of this specification, in which—

Figure 1:
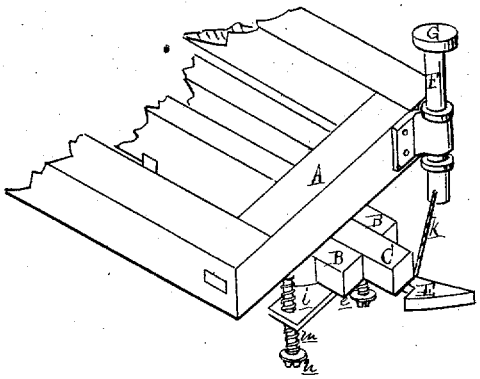
Figure 2:
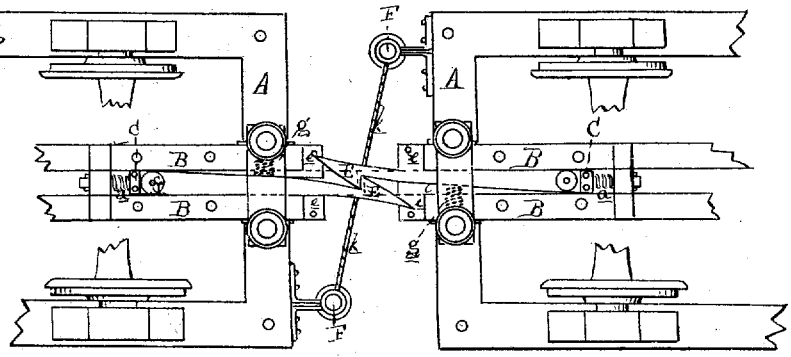
Figure 3:
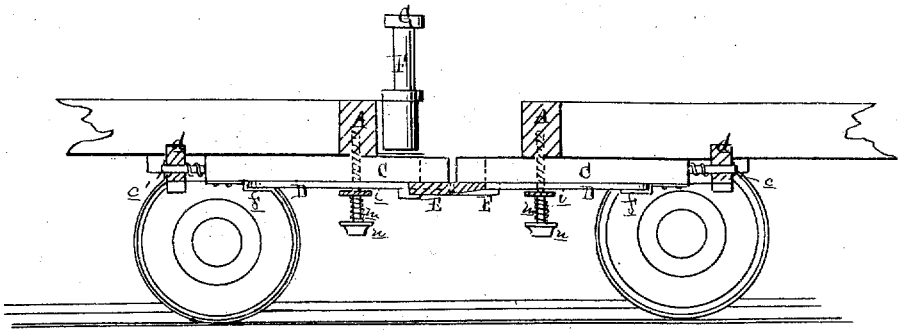

Figure 1 is a perspective of one end of a railroad-car with its portion of the coupling in place, each half of said coupling being precisely alike. Fig. 2 represents a bottom view of two adjoining ends of similar cars coupled together. Fig. 3 is a longitudinal vertical section through the adjoining ends of cars coupled together.

Like letters indicate like parts in each figure.

This invention consists in the combination of an adjustable supporting-stirrup with hooked coupling, and the combination of the stirrup with supporting-rod, springs, and adjustant-nut; and also the combination of the catches, and the spring-buffers, all as more particularly hereinafter described.

The object of the invention is to avail myself of the benefit of the vertical jaws upon such couplings, which admit of coupling themselves when run together, regardless of which end of cars provided with them are brought together, and at the same time prevent the recoil or sudden starting of the train from springing the couplings apart and thus disconnecting the cars; also, to enable me, when desirable, to readily uncouple the cars by suitable devices arranged to force the jaws apart for that purpose.

The invention consists mainly in the combination of a supporting-stirrup with hooked coupling, as will be fully described hereafter.

A represents the end of a car-frame having longitudinal pieces B B arranged underneath the platform, and far enough apart to allow the spring-buffer C to move longitudinally between them. The buffer C has a spring, *a*, behind it, which may be of any suitable material having sufficient elasticity and strength, and may be held up at its rear end by a round tenon, *c*, passing through a guide-piece, *d*, and at its front end by a plate, *e*, as shown in the drawings, or in any other way that will allow said buffer a longitudinal but no lateral play. To the under side of these spring-buffers, and near their rear ends, as at *f*, are pivoted the shanks D of the hooks E, so that said shanks and hooks may move laterally, but against the action of the springs *g*, whose tendency is to restore them to their normal condition or position and to compel them toward each other, so that the hooks will readily engage with each other when the cars are to be coupled together. Thus the hooks have two motions—a longitudinal one from their connection with the buffers, and the lateral one just described. The forward ends of the hooks are held up by a stirrup or plate, *i*, which may be provided, if desired, with springs *m* to prevent any sudden jar, and the adjustment-nuts *n* to regulate the height of the hooks, should there be any disparity in the heights of the platforms of adjoining cars in a train furnished with hooked couplings. A shaft, F, having a hand-wheel, G, or an equivalent lever and chain, *k*, one end of which is attached to the hooked coupling and the opposite end to the shaft F, or its equivalent lever, is used for withdrawing the couplings from their engagement with each other without the necessity of the operator leaving the platform. As hereinbefore mentioned, the buffer need not be connected with the shank of the coupling, but may be provided with a spring to act entirely independent of and disconnected with the couplings; but the buffers should be so arranged that in coupling two cars together the jaws or hooks will engage with each other just as or a little before the buffers come in contact with each other, so that the force of the blow will be counteracted on the buffer-springs; and when the train is straightened out the strain is partially taken up on the springs *a* when the couplings are connected with the buffers, or upon other springs secured to the shank of the couplings when such couplings are not connected with the buffers, without any sudden strain upon the hooks or catches, and consequently there is no tendency to spring them apart.

What I claim as the invention of MILAN WATERBURY, and desire to secure by Letters Patent, is—

1. The combination of the hooked coupling E and the adjustable supporting-stirrup *i*, each constructed and arranged substantially as and for the purpose described.

2. The combination of the stirrup *i* with the supporting-rod, springs *m*, and adjusting-nut *n*, substantially as described.

3. The hooks E E, in combination with the spring-buffers C C, the former being adapted to move longitudinally with the latter, and to have also an independent lateral motion, substantially as described.

WILLIAM B. WAY.

Witnesses:
H. F. EBERTS,
H. S. SPRAGUE.